United States Patent [19]
Hattori et al.

[11] Patent Number: 5,601,946
[45] Date of Patent: Feb. 11, 1997

[54] RECTANGULAR SEALED ALKALINE STORAGE BATTERY AND MODULE BATTERY THEREOF

[75] Inventors: Yohei Hattori, Kadoma; Nobuyasu Morishita, Fujiidera; Hiromu Matsuda, Hyogo-ken; Munehisa Ikoma, Nara-ken, all of Japan

[73] Assignee: Matsushita Electric Industrial Co., Ltd., Osaka, Japan

[21] Appl. No.: 264,500

[22] Filed: Jun. 23, 1994

[30] Foreign Application Priority Data

Dec. 7, 1993 [JP] Japan ................................. 5-306384

[51] Int. Cl.⁶ ............................................... H01M 10/24
[52] U.S. Cl. ............................................................ 429/206
[58] Field of Search ................................ 429/53, 57, 66, 429/82, 129, 131, 132, 99, 153, 159, 228, 225, 218, 206, 192

[56] References Cited

U.S. PATENT DOCUMENTS

| | | |
|---|---|---|
| 2,988,585 | 6/1961 | Peters . |
| 3,764,387 | 10/1973 | Stark . |
| 3,861,963 | 1/1975 | Afrance et al. . |
| 4,480,018 | 10/1984 | de Bellis et al. . |
| 5,455,125 | 10/1995 | Matsumoto et al. . |

FOREIGN PATENT DOCUMENTS

| | | |
|---|---|---|
| 0073625A1 | 3/1983 | European Pat. Off. . |
| 0432342A1 | 6/1991 | European Pat. Off. . |
| 0512565A2 | 11/1992 | European Pat. Off. . |
| 0587974A1 | 3/1994 | European Pat. Off. . |
| 0587974 | 3/1994 | European Pat. Off. . |
| 1218607 | 5/1960 | France . |
| 2027978 | 2/1980 | United Kingdom . |

OTHER PUBLICATIONS

Patent Abstracts of Japan, vol. 16, No. 300 (E–1227) 16 Mar. 1992 & JP–A–04 082 171 (Toshiba Battery Co Ltd).
Patent Abstracts of Japan, vol. 10, No. 275 (E–438) 15 May 1986 & JP–A–61 096 659 (Matsushita Electric Ind Co).

*Primary Examiner*—Maria Nuzzolillo
*Attorney, Agent, or Firm*—Watson Cole Stevens Davis, P.L.L.C.

[57] ABSTRACT

A relatively large rectangular sealed alkaline storage battery used for electric cars, etc. is disclosed. The battery has such an inner construction as to inhibit deformation of the electrode group caused by charging and discharging so as to improve the life characteristics. The electrode group comprises positive electrode plates alternating with negative electrode plates in a planar direction and separators between the adjacent electrode plates. The electrode group and an alkali electrolyte are inserted in a container, which is sealed by a cover provided with a safety vent and the position of the electrode group in the container is controlled by fixing poles to the cover. The amount of the alkali electrolyte is 1.5–2.5 $cm^3$/battery capacity 1 Ah. Especially, for a module battery, a given distance is provided between the shorter side face of the electrode group and the inner wall of the container, and the outer longer side faces of the container are constrained by a metallic plate.

25 Claims, 3 Drawing Sheets

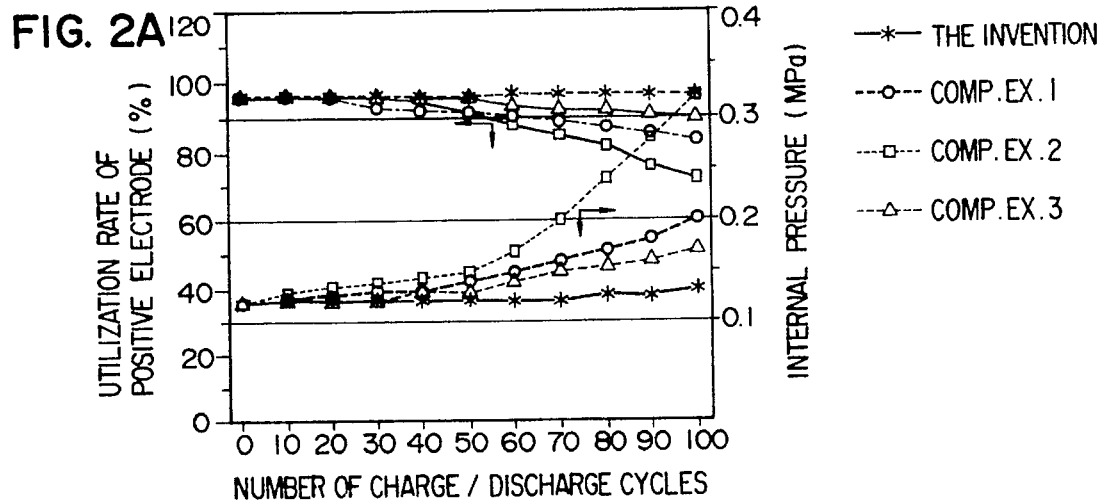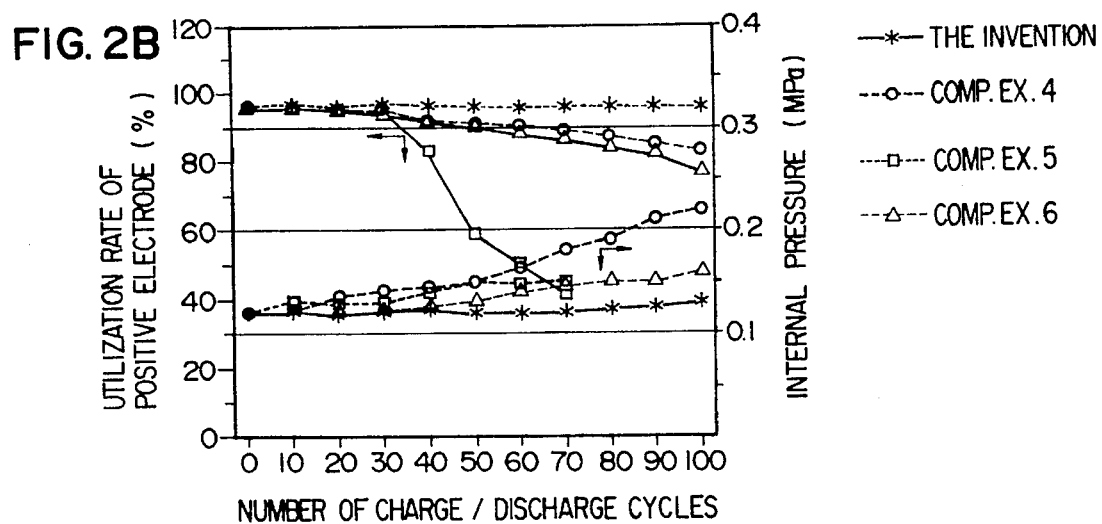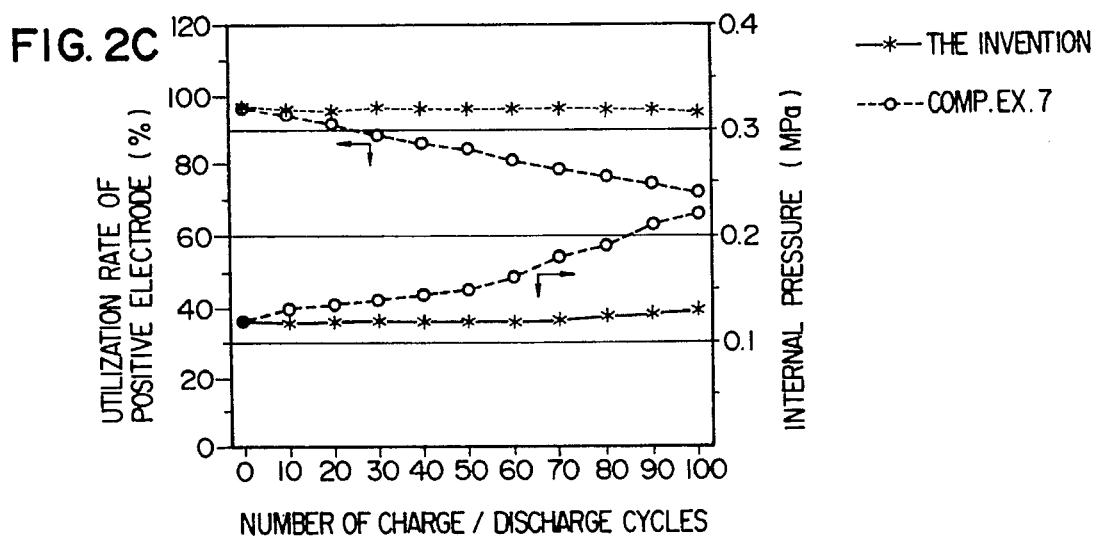

RECTANGULAR SEALED ALKALINE STORAGE BATTERY AND MODULE BATTERY THEREOF

BACKGROUND OF THE INVENTION

1. Field of the Invention

The present invention relates to a relatively large rectangular sealed alkaline storage battery and a module battery comprising the collected storage batteries.

2. Prior Art

At present, as for large storage batteries, lead acid storage batteries are used as batteries for SLI of automobiles and stationary batteries. As electric sources for small home equipments, nickel-cadmium storage batteries are used and recently, alkaline storage batteries such as nickel-metal hydride storage batteries superior in energy density have spread.

In recent years, environmental disruption has rapidly advanced on a global scale and as one cause thereof, waste gases from automobiles have become a problem. In order to cope with the problem, development of electric cars has been hastened and development of electric sources holds the key to the attainment of the development of the electric cars.

As these driving electric sources, lead acid storage batteries are mainly used at present. However, since the lead acid storage batteries are low in energy density per unit weight, one charge distance range is very short. Furthermore, since these batteries are of an open type, troublesome maintenance such as electrolyte addition is needed. Furthermore, nickel-cadmium storage batteries or nickel-iron storage batteries high in energy density and long in one charge distance range are also partially used as electric sources for electric cars, but these storage batteries are also not of a sealed type and need troublesome maintenance such as electrolyte addition.

From the viewpoint of safety, too, sealed batteries which require a minimum amount of an electrolyte are desired.

On the other hand, since the internal pressure of sealed alkaline storage batteries increases owing to the gas generated at the time of charging and discharging, a safety vent is provided at the sealed container and when this safety vent operates and mist of electrolyte is released outside together with the gas, the battery capacity decreases due to decrease of the amount of an electrolyte.

To solve these problems and realize increase of one charge distance range and maintenance-free batteries, development of new storage batteries of a high energy and completely sealed type is demanded.

The above storage batteries when subjected to charging and discharging cause expansion and shrinkage of electrodes. When the structure is of rectangular sealed type, the group of expanded electrodes is pressed by the container wall to cause distortion of plates and the distance between the facing plates becomes non-uniform and the active material partially falls off in case there is no sufficient space between the container inner wall and the shorter side face or the bottom of the electrode group.

For this reason, the electrode reaction becomes non-uniform and the active material cannot be effectively utilized, causing reduction of discharge capacity, rise of the internal pressure of the batteries during charging and internal short-circuit. Furthermore, if there is no space in the container containing the electrode group, it is difficult to carry out rapid filling of a given amount of an electrolyte.

Moreover, if the amount of the electrolyte to be filled is insufficient for the reaction capacity of a nickel cathode, utilization and cycle life of the batteries decrease. If the amount of the electrolyte is too much, the reaction at the anode for absorbing oxygen gas generated from the cathode in the case of overcharging is hindered and the mist of electrolyte leaks through the safety vent together with the gas to result in reduction of cycle life.

Normally, the electrode group is composed of piled electrode plates. Therefore, unless the electrode group is constrained with a band or the like, operability for insertion of the electrode group into the container is low. The expansion of the electrode group is conspicuous in the non-constrained direction or in the downward direction of the electrode plates where the constraint is weak. Therefore, in case the length of the lower part of a bag-like separator which covers the electrode plate has no margin and further, the lower part of the bag-like separator is closed, for example, by fusion bonding, the lower part of the separator is broken by the expanded plate and there are also the possibility of falling off of the active material to the bottom of the container and the possibility of internal short-circuit.

Furthermore, if the electrode plate is completely covered up to the top part thereof by the separator, the gas generated at charging and discharging stays in the separator and the battery may rupture due to rising of gas pressure. Moreover, in case the container is made of a synthetic resin, when the electrode plate group expands in the direction of the longer side face of the container, the container itself is distorted and consequently, there is no sufficient space between the shorter side face of the electrode group and the inner wall of the container.

SUMMARY OF THE INVENTION

The first object of the present invention is to maintain uniform electrode reaction inside the container by employing such a construction as permitting the electrode group to deform in the direction of the shorter side face of the electrode group and inhibiting the electrode group from expanding in the direction of the longer side face of the container. The second object is to provide a sealed alkaline storage battery excellent in life characteristics and safety by rapidly filling the container with a proper amount of electrolyte.

BRIEF DESCRIPTION OF THE DRAWINGS

FIG. 2A is a graph which shows the influence of the distance between the shorter side face of an electrode group and the inner wall of a container on the charging and discharging cycle life characteristics.

FIG. 2B is a graph which shows the influence of a method of connecting bag-like separators and a ratio in size of the separator and the plate on the charging and discharging cycle life characteristics.

FIG. 2C is a graph which shows the influence of the presence of constraint by a metallic sheet at the external longer side face of the container on the charging and discharging cycle life characteristics.

DETAILED DESCRIPTION OF PREFERRED EMBODIMENTS

Figure 1A:
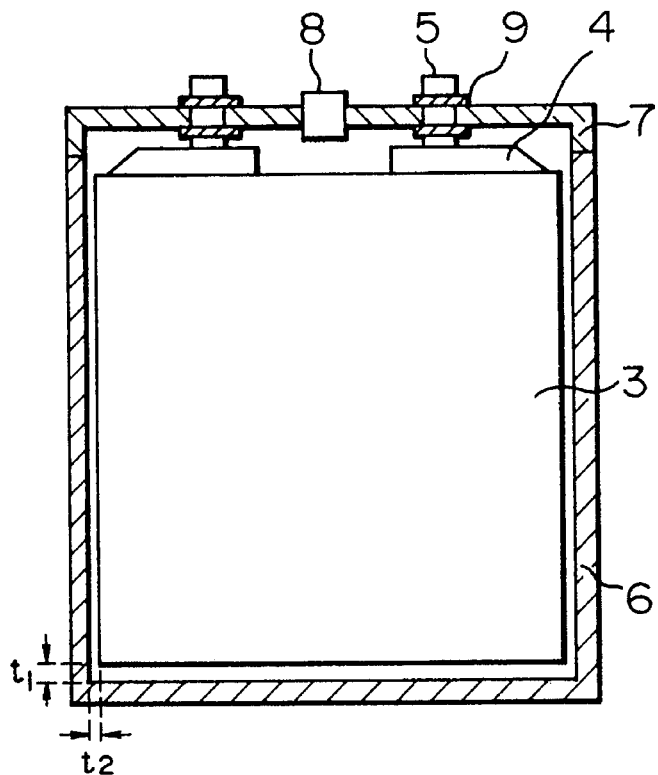
FIG. 1A is an internal front view of a rectangular sealed alkaline storage battery in an example of the present invention.

The present invention provides a rectangular sealed alkaline storage battery which comprises a container in which are inserted an electrode group composed of positive electrode plates and negative electrode plates alternately stacked in the planar direction with separators between adjacent plates, the electrode group being bound by a band at at least one portion, and an alkali electrolyte in such a proper amount as not hindering the gas absorption reaction at an overcharging with maintaining the rate of utilization of positive electrode, said container being sealed by a cover provided with a safety vent, characterized in that a suitable distance can be provided between the electrode group and the inner side wall of the container and between the electrode group and the inner bottom of the container by fixing poles provided at the top of the electrode group to the cover and deformation of the expanded electrode group is absorbed by said space.

Furthermore, by leaving a margin in the length of the lower part of the bag-shaped separator which wraps the plate and by merely folding the lower part of the separator without fusion bonding the lower part, breaking of the bottom part of the separator caused by deformation of the plate and downward expansion of the plate is prevented to improve the life characteristics of the battery.

Moreover, at least a portion of the upper part of the separator covering the plate is non-bonded, whereby an escaping passage for the gas generated at charging and discharging is ensured and rupture of the battery due to the rising of gas pressure is avoided.

Further, according to the present invention, in each of the cells of the rectangular sealed alkaline storage batteries or in a module battery comprising a plurality of the cells connected, the whole or a part of the external longer side face of the container is constrained by a band such as a metallic sheet to such an extent that the width of the container does not change, thereby inhibiting the deformation of the container caused by expansion of the electrode group in the direction of the longer side face and maintaining the space provided between the shorter side face of the electrode group and the inner wall of the container.

The sealed alkaline battery of the present invention has such a construction that the electrode group composed of a plurality of positive plates alternating with a plurality of negative plates and separators between adjacent plates of opposite polarity is permitted to deform in the direction of the shorter side face due to expansion of the electrode group and expansion of the electrode group in the direction of the longer side face is inhibited, and in addition, breaking and deformation of the lower part of the separator are also inhibited, whereby the state of the plates being in close to each other can be maintained and uniformity of the electrode reactions can be kept.

Moreover, by inhibiting the falling off of the active material and the internal short-circuit, decrease in utilization of a positive electrode with lapse of charging and discharging cycles and rising of internal pressure of the battery can be restrained.

Further, due to the diminishment of the space between the plates, thermal conductivity is improved to avoid accumulation of heat at the time of charging and thus, heat generation rate is lowered and the time for reaching oxygen overpotential can be delayed. As a result, inhibition of rising of internal pressure and improvement of charging efficiency can be attained. In addition, decrease in utilization of cathode and leakage of the electrolyte caused by working of the safety vent do not occur by filling the electrolyte in proper quantities in the container.

Thanks to the above-mentioned advantageous effects in combination, sealed alkaline storage batteries high in utilization of active material and excellent in life characteristics can be provided.

Examples of the present invention will be explained with reference to the accompanying drawings.

EXAMPLE 1

Figure 1B:
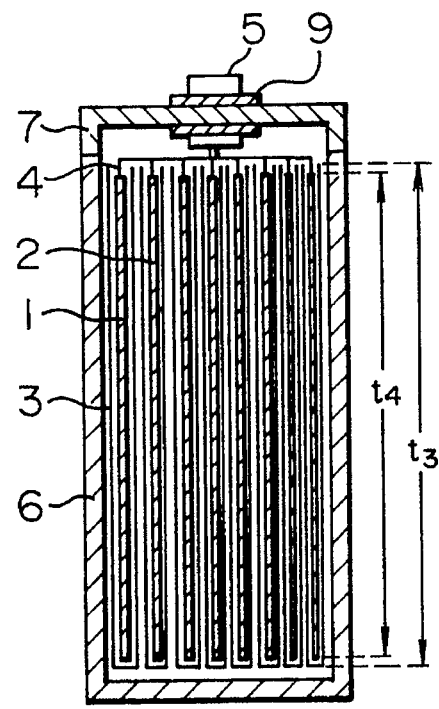
FIG. 1B is an internal side view of a rectangular sealed alkaline storage battery in an example of the present invention.
Figure 1C:
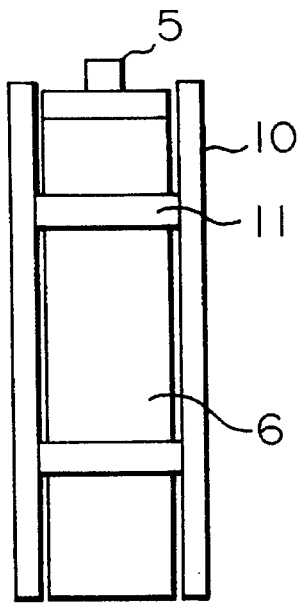
FIG. 1C is an external side view of a rectangular sealed alkaline storage battery in an example of the present invention.

FIGS. 1A, 1B and 1C show the construction of the rectangular sealed alkaline storage battery used in this Example in which 1 indicates a negative electrode plate prepared by filling a hydrogen-storing alloy mainly composed of $MmNi_5$ in a matrix comprising a foamed nickel porous body or by coating a paste mainly composed of a hydrogen-storing alloy on one or both sides of a plate-like matrix, 2 indicates a positive electrode plate prepared by filling a powder mainly composed of nickel hydroxide in a matrix comprising a foamed nickel porous body, and 3 indicates a polypropylene separator subjected to the hydrophilizing treatment. These positive and negative electrode plates were respectively wrapped with the separators and twelve positive electrode plates were alternated with thirteen negative electrode plates to form an electrode group.

Separator 3 was in the form of a bag which was folded in the form of U at the portion which contacted with the lower part of the plate and which was fusion bonded at the left and right side edge portions. The upper portion of the bag separator extended 3 mm over the top of the plate with only a part thereof being bonded. When the length of the plate (size of the plate in lengthwise direction) is $t_4$ and that of the separator is $t_3$, $t_3/t_4$ was 1.01. The thickness of the electrode group was 95% of the inner size of the container. The capacity of this battery was regulated by the positive electrode and the capacity was 100 Ah. The numeral 4 indicates a nickel collector, 5 indicates a pole, 6 indicates a polypropylene container, 7 indicates a polypropylene cover, 8 indicates a safety vent (working pressure 0.2–0.3 kg/cm$^2$), and 9 indicates a member fixing the pole to the cover of the container.

170 cm$^3$ of an aqueous alkali solution mainly composed of potassium hydroxide was filled as an electrolyte. Outer size of the container was 35 mm long×120 mm broad×196 mm high and the size of the plate was 154 mm in the direction of height of the container and 108 mm in the direction of breadth of the container. When the distance between the inner bottom of the container and the bottom of the electrode group is expressed by $t_1$, $t_1$ was 2 mm and when the distance between the shorter inner side face of the container and the shorter side face of the electrode group is expressed by $t_2$, $t_2$ was 1 mm. The thus fabricated cell was constrained at the longer side faces of the container by aluminum reinforcing sheets 10 of 8 mm thick and iron bands 11 to such an extent that the width of the container did not change, and charging and discharging were carried out. The environmental temperature was 25° C. The discharge capacity test was conducted in the following manner. The cell was charged at 10 A for 12 hours, and after suspension of the charging for 1 hour, the cell was discharged at 20 A until the terminal voltage reached 1 V. The discharge capacity was calculated using the time required for reaching that voltage and was expressed as a utilization rate of positive electrode. The cycle life test was conducted by repeating the same conditions as of the discharge capacity test.

As comparative examples, cells were fabricated with changing the values of $t_1$–$t_4$. In this case, the value of $t_1$ was changed by moving up and down the position at which the pole was fixed to the cover of the container and the value of $t_2$ was changed by changing the breadth of the plate. The value $t_3/t_4$ was changed by fixing the size of the separator and changing the length of the plate. Furthermore, comparison was made on how the bag of each separator was closed and whether the external constraint of the container was effected or not.

Table 1 is a list of the Comparative Examples.

TABLE 1

| | $t_1$ | $t_2$ | $t_3/t_4$ | The lower part of separator | The upper part of separator | Constraint of container |
|---|---|---|---|---|---|---|
| The present invention | 2 | 1 | 1.01 | Folded | Partially closed | Constrained |
| Comparative Example 1 | 1 | 1 | 1.01 | Folded | Partially closed | Constrained |
| Comparative Example 2 | 0 | 1 | 1.01 | Folded | Partially closed | Constrained |
| Comparative Example 3 | 2 | 0 | 1.01 | Folded | Partially closed | Constrained |
| Comparative Example 4 | 2 | 1 | 1.00 | Folded | Partially closed | Constrained |
| Comparative Example 5 | 2 | 1 | 1.00 | Fusion bonded | Partially closed | Constrained |
| Comparative Example 6 | 2 | 1 | 1.01 | Folded | Completely closed | Constrained |
| Comparative Example 7 | 2 | 1 | 1.01 | Folded | Partially closed | Non-constrained |

FIGS. 2A, 2B and 2C show changes of the utilization rate of positive electrode and the internal pressure of cells in charging with lapse of charging and discharging cycles. The four upper curves concern the utilization rate and the four lower curves concern the internal pressure in each of these figures. FIG. 2A shows the influence of the distance between the inner wall of the container and the shorter side face of the electrode group on the cycle life characteristics. As can be seen from FIG. 2A, in the cell of the present invention, a utilization rate of 96% was obtained and the utilization rate was substantially the same even after repetition of 100 cycles of charging and discharging. On the other hand, in the case of Comparative Examples 1 and 2, with decrease in the value of $t_1$, the utilization rate of positive electrode decreased with lapse of the cycles. Regarding the change of internal pressure of the cells in charging, the internal pressure increased with lapse of the cycles by decreasing the value of $t_1$. Furthermore, in Comparative Example 3, when the value of $t_2$ was smaller than 1 mm, decrease in life characteristics was seen with lapse of cycles. In these cases, it can be considered that the expanded electrode plates were pressed back by the inner wall of the container to cause distortion of the electrode group and thus, smooth electrode reaction was hindered and the charging and discharging efficiency decreased, bringing about decrease in utilization of positive electrode and increase in internal pressure of the cells. Accordingly, for permitting the electrode plates to expand in charging and discharging and improving the life characteristics, $t_1 \geq 2$ and $t_2 \geq 1$ are necessary as in the present invention.

Next, the influence of the structure of separator on the cycle life characteristics is shown in FIG. 2B.

When there was left no margin in the length of separator at the lower part of the plate as in Comparative Example 4, decrease in the utilization rate of positive electrode and increase in the internal pressure of cell were recognized with lapse of charging and discharging cycles, but $t_3/t_4 \geq 1.01$ was sufficient to restrain decrease in the utilization rate of positive electrode. In this case, too, since expansion of the electrode plates occurs by repetition of charging and discharging, unless a space sufficient to permit the expansion is previously provided below the separator, the shorter side of the expanded plates was pressed back to the bottom of the bag separator, resulting in break or bend of the electrode plates. Therefore, it is considered that the state of the plates being in close to each other cannot be maintained and uniform electrode reaction is hindered to cause decrease in discharge capacity and increase in the internal pressure of the battery.

On the other hand, when too much space is provided, filling amount of the active material of the plate decreases and nominal capacity cannot be ensured. Taking into consideration the elongation of the plates, the upper limit of $t_1$ is specified to be 10 mm, that of $t_2$ is specified to be 5 mm and that of $t_3/t_4$ is specified to be 1.05.

In Comparative Example 5, the lower part of the bag separator was closed by fusion bonding and furthermore, $t_3/t_4$ was 1.00. As shown in FIG. 2B, a considerable decrease in utilization of positive electrode was seen in the cycle life test. This is because the lower part of the separator was broken by the electrode plate which expanded in the lengthwise direction, thereby causing occurrence of internal short circuit.

In Comparative Example 6, the upper part of the separator was completely closed and decrease in utilization rate of positive electrode with lapse of cycles was seen. It is considered that this is because the gas generated at the electrode plates in charging remained in the separator to cause distortion of the electrode group to deteriorate the charging efficiency.

FIG. 2C shows the cycle life characteristics when charging and discharging of the cell of Comparative Example 7 were effected without externally constraining the container by metallic sheet (holder) 10 and connecting band 11. Since the container was made of a resin, the container greatly expanded in the direction of its longer side face. Therefore, the electrode group was pressed at its shorter side face by the inner wall of the container and was distorted, and in addition, the contact area of the matrix of the positive and negative electrode plate with the active material decreased to cause decrease in charging and discharging efficiency of the battery. Accordingly, it is necessary to externally constrain the longer side face of the container in such a manner as to inhibit the expansion of the container.

In the Example of the present invention, a container made of a resin was used, but the similar effect can be obtained with a metallic container (made of stainless steel, nickel plated iron or the like).

EXAMPLE 2

In the same manner as in Example 1, cells of the sealed alkaline storage battery were fabricated with changing the amount of electrolyte. These cells were subjected to cycle life test under the same charging and discharging conditions as in Example 1. The results are shown in Table 2. The cycle life test was terminated when the utilization rate of positive electrode reached 60% of the initial value.

TABLE 2

| Cell No. | Amount of electrolyte | Initial utilization rate | Cycle life |
| --- | --- | --- | --- |
| 1 | 130 cm³ | 87.7% | 370 cycles |
| 2 | 140 cm³ | 91.4% | 450 cycles |
| 3 | 150 cm³ | 95.9% | 810 cycles |
| 4 | 170 cm³ | 96.1% | 900 cycles |
| 5 | 200 cm³ | 96.8% | 840 cycles |
| 6 | 210 cm³ | 97.2% | 570 cycles |
| 7 | 250 cm³ | 97.0% | 550 cycles |
| 8 | 260 cm³ | 97.2% | 250 cycles |

The cell No.1 containing 130 cm³ of the electrolyte was low in both the initial utilization rate and the cycle life. It is considered that this is because owing to the repetition of the charging and discharging cycles, the nickel positive electrodes swelled and absorbed the electrolyte and thus, a sufficient amount of the electrolyte did not reach the negative electrodes and as a result, deterioration of the hydrogen—storing alloy was accelerated. The cell No.8 containing 260 cm³ of the electrolyte was the best in the initial utilization rate, but considerably deteriorated in cycle life as compared with the cells of Nos. 2–7. It is considered that this is because the large amount of the electrolyte hindered the absorption reaction at the negative electrode for oxygen gas generated from the positive electrode at overcharging to bring about increase in internal pressure of the cell and finally to cause leakage of the electrolyte from the safety vent, and as a result, the cycle life deteriorated. The results of the cycle life test on the cells of Nos. 3–7 were good, namely, more than 500 cycles. In view of the above results, the amount of electrolyte is desirably 1.5–2.0 cm³/Ah (cell capacity).

EXAMPLE 3

In the same manner as in Example 1, cells of the sealed alkaline storage battery were fabricated with changing the values of $t_1$ mm and $t_2$ mm. The filling of electrolyte was carried out once for each of the cells. The results are shown in Table 3. The amount of electrolyte was 170 cm³ and 180 cm³.

TABLE 3

| Cell No. | Amount of electrolyte to be filed | $t_1$ | $t_2$ | Residual amount of electrolyte to be filled |
| --- | --- | --- | --- | --- |
| 9 | 170 cm³ | 2 mm | 1 mm | 0 cm³ |
| 10 | 170 cm³ | 1 mm | 1 mm | 4 cm³ |
| 11 | 170 cm³ | 0 mm | 1 mm | 6 cm³ |
| 12 | 170 cm³ | 2 mm | 0 mm | 2 cm³ |
| 13 | 180 cm³ | 2 mm | 1 mm | 0 cm³ |

For the cells of Nos. 9 and 13 in which a proper space was provided in the container by employing 2 mm as $t_1$ and 1 mm as $t_2$ according to the present invention, a given amount of the electrolyte could be filled by one filling operation with no dependence on the filling amount of the electrolyte. It can be seen that with decrease in the space between the electrode group and the inner wall of the container, the amount of the electrolyte which was not filled in the cell increased. Since when a cell is charged and discharged, the electrode plate expands, it is necessary to fill the electrolyte in a somewhat excess amount in the stage before the initial charging, taking into consideration the expansion of the electrode plate. Therefore, it is necessary to employ such a construction as in the present invention where the electrolyte once stays in the space provided in the container and then penetrates into the electrode group.

EXAMPLE 4

In the same manner as in Example 1, cells of sealed alkaline storage battery were fabricated which were provided with safety vents differing in working pressure. These cells were subjected to the cycle life test under the same charging and discharging conditions as in Example 1. The results are shown in Table 4.

TABLE 4

| Cell No. | Working pressure of safety valve | Initial utilization rate | Cycle life |
| --- | --- | --- | --- |
| 14 | 0.05 MPa | 88.3% | 260 cycles |
| 15 | 0.10 MPa | 91.2% | 470 cycles |
| 16 | 0.20 MPa | 96.2% | 900 cycles |
| 17 | 0.50 MPa | 95.3% | 820 cycles |
| 18 | 0.60 MPa | 90.7% | 610 cycles |

The cell of No. 14 in which the working pressure of the safety vent was 0.05 MPa and that of No.15 in which the working pressure of the safety vent was 0.1 MPa could not be sufficiently charged because the safety vent worked immediately when overcharging began and the utilization rate was low. Furthermore, the cycle life of these cells decreased due to the frequent leakage of electrolyte. In the case of the cell of No.18 in which the working pressure of the safety vent was high, namely, 0.6 MPa, the vent did not work even when the internal pressure of the cell at the charging increased over normal level, and the electrode group deformed due to the excessive pressure. Therefore, a space was produced inside the electrode group to cause non-uniform charging and discharging reactions and the utilization rate of cathode decreased.

From the above results, the working pressure of the safety vent is desirably 0.2–0.5 MPa.

EXAMPLE 5

A module battery was fabricated using five cells of the sealed alkaline storage battery of Example 1 by connecting the cells in series by a connecting plate and constraining both ends of the connected cells in the connecting direction by aluminum reinforcing sheets (holder) 10 and iron connecting bands 11.

Figure 3:
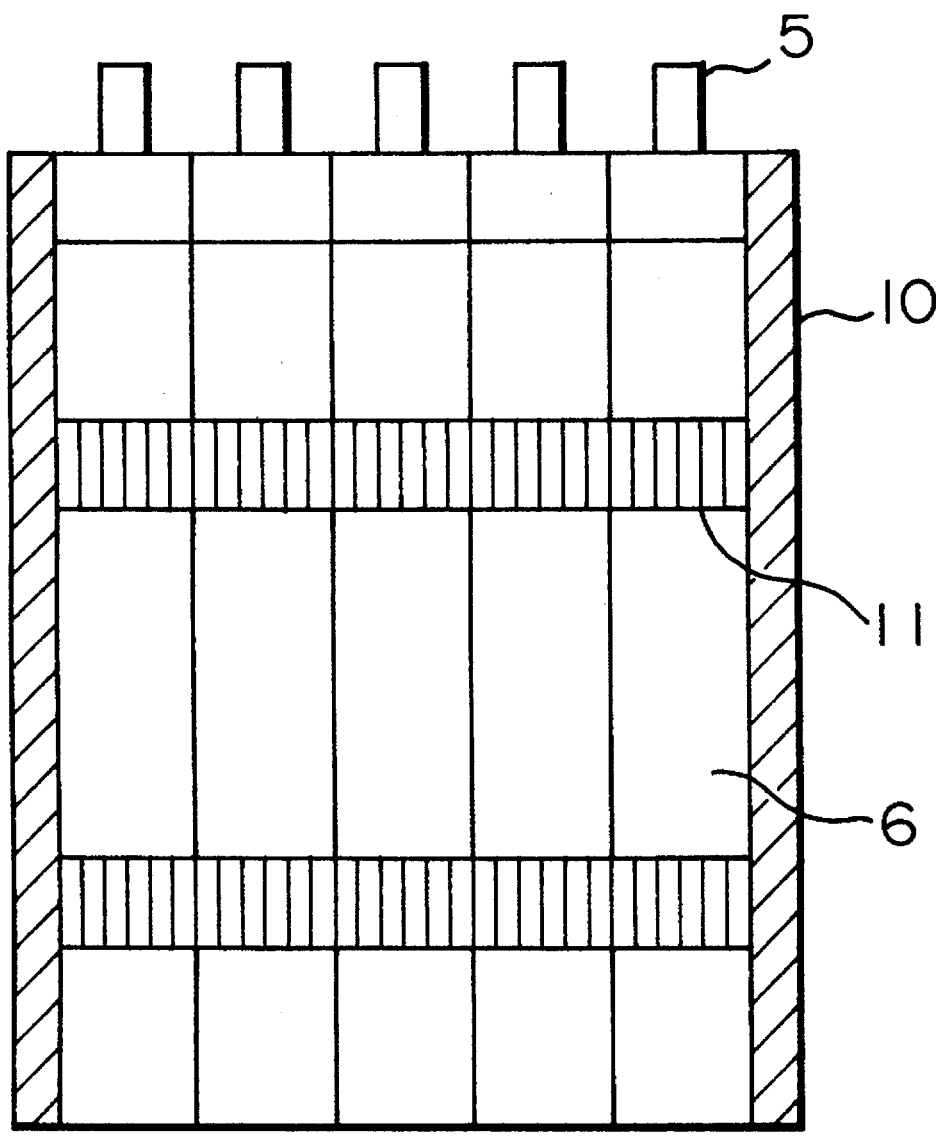
FIG. 3 is an external side view of the module battery in the example of the present invention.

The thus obtained module battery is shown in FIG. 3. Separately, a module battery which was not constrained was fabricated as a comparative example. These module batteries were subjected to the cycle life test as in Example 1. The results for the non-constrained comparative module battery were the same as those for Comparative Example 7 in Example 1. On the other hand, the module battery of the present invention showed the same results as of the cell of the present invention and showed neither decrease in the utilization rate nor increase in the internal pressure. This module battery can be provided with spacers between the cells or ribs on the surface of the battery in order that a cooling medium (air, water, solvent, or the like) can pass between the cells. Such structure makes it possible to uniformly cool the cells and to render constant the utilization rate of the cells.

As explained above, the present invention can provide a sealed alkaline storage battery in which uniform electrode reactions can be maintained and which is high in utilization rate of active material, excellent in life characteristics and high in safety.

What is claimed is:

1. A rectangular sealed alkaline storage battery comprising:
   a container having an opening, a bottom wall and at least one inner side wall;
   an electrode group having at least one longer side face and at least one shorter side face and disposed in the container so as to have a top portion and a bottom portion, the electrode group comprising (i) positive electrode plates and negative electrode plates disposed in alternation, (ii) separators separating adjacent ones of the positive and negative electrode plates and (iii) poles provided at the top portion;
   an alkali electrolyte in said container; and
   a cover disposed on the container to seal the opening of the container and provided with a safety vent, wherein:
   a position of the electrode group in the container is controlled by fixing the poles provided at the top portion of the electrode group to the cover;
   spaces are provided between the bottom portion of the electrode group and the bottom wall of the container and between the at least one shorter side face of the electrode group and the at least one inner side wall of the container;
   the positive electrode plates, the negative electrode plates, or both the positive electrode plates and the negative electrode plates are covered in their entireties by the separators, the separators extending from the bottom portion to the top portion of the electrode group, each of the separators being formed by a continuous sheet which is folded into a U-shape to cover a bottom end of a respective one of the positive electrode plates, the negative electrode plates, or both the positive electrode plates and the negative electrode plates;
   distance $t_1$ between the bottom portion of the electrode group and the bottom wall of the container satisfies a relation 2 mm $\leq t_1 <$ 10 mm; and
   distance $t_2$ between the at least one shorter side face of the electrode group and the at least one inner side wall satisfies a relation 1 mm $\leq t_2 <$ 5 mm.

2. A rectangular sealed alkaline storage battery according to claim 1, wherein each of the separators has an upper end which extends over the top portion of the electrode group, the upper end of said each of the separators being only partially bonded shut.

3. A rectangular sealed alkaline storage battery according to claim 1, wherein each of the separators has end portions which extend horizontally beyond the electrode group, said end portions of said each of said separators being fusion-bonded together so that each of said separators assumes a form of an envelope.

4. A rectangular sealed alkaline storage battery according to claim 1, wherein the separators extend below the bottom portion of the electrode group and wherein a vertically measured length $t_3$ of the separator and a vertically measured length $t_4$ of the electrode group satisfy a relation 101% $\leq t_3/t_4 \leq$ 105%.

5. A rectangular sealed alkaline storage battery according to claim 1, wherein the separators extend upwardly over the top portion of the electrode group and portions of the separators extending over the top portion of the electrode group have a length of 2–10 mm.

6. A rectangular sealed alkaline storage battery according to claim 1, wherein said positive electrode plates comprise a nickel oxide and said negative electrode plates comprise a hydrogen-storing alloy capable of electrochemically occluding and releasing hydrogen.

7. A rectangular sealed alkaline storage battery according to claim 1, wherein the electrode group is bound with a band.

8. A rectangular sealed alkaline storage battery according to claim 1, wherein a working pressure of the safety vent is 0.2–0.5 MPa.

9. A module battery which comprises a plurality of rectangular sealed alkaline storage battery cells which are electrically interconnected with one another and which are arranged in a cell connecting direction, each of said plurality of rectangular sealed alkaline storage battery cells comprising:
   a container having an opening, a bottom wall and at least one inner side wall;
   an alkali electrolyte disposed in the container; and
   an electrode group having at least one longer side face and at least one shorter side face and disposed in the container so as to have a top portion and a bottom portion, the electrode group comprising (i) positive electrode plates and negative electrode plates disposed in alternation, (ii) separators separating adjacent ones of the positive and negative electrode plates, and (iii) poles provided at the top portion of the electrode group; and
   a cover disposed on the container to seal the opening of the container and provided with a safety vent, wherein:
   a position of the electrode group in the container is controlled by fixing the poles provided at the top portion of the electrode group to the cover;
   a space exists between the bottom portion of the electrode group and the bottom wall of the container and between the at least one shorter side face of the electrode group and the at least one inner side wall of the container;
   the positive electrode plates, the negative electrode plates, or both the positive electrode plates and the negative electrode plates are covered in their entireties by the separators, the separators extending from the bottom portion to the top portion, each of the separators being formed by a continuous sheet which is folded into a U-shape to cover a bottom end of a respective one of the positive electrode plates, the negative electrode plates, or both the positive electrode plates and the negative electrode plates;
   the module battery further comprises holder means for at least partially constraining the module battery in the connecting direction;
   distance $t_1$ between the bottom portion of the electrode group and the bottom wall of the container satisfies a relation 2 mm $\leq t_1 <$ 10 mm; and
   distance $t_2$ between the at least one shorter side face of the electrode group and the at least one inner side wall satisfies a relation 1 mm $\leq t_2 <$ 5 mm.

10. A module battery according to claim 9, wherein each of the separators has an upper end which extends over the top portion of the electrode group, the upper end of said each of the separators being only partially bonded shut.

11. A module battery according to claim 9, wherein each of the separators has end portions which extend horizontally beyond the electrode group, said end portions of said each of said separators being fusion-bonded together so that said each of said separators assumes a form of an envelope.

12. A module battery according to claim 9, wherein the separators extend below the bottom portion of the electrode group and wherein a vertically measured length $t_3$ of the separator and a vertically measured length $t_4$ of the electrode group satisfy a relation $101\% \leq t_3/t_4 \leq 105\%$.

13. A module battery according to claim 9, wherein the separators extend upwardly over the top portion of the electrode group and portions of the separators extending over the top portion of the electrode group have a length of 2–10 mm.

14. A module battery according to claim 9, wherein said positive electrode plates comprise a nickel oxide and said negative electrode plates comprise a hydrogen-storing alloy capable of electrochemically occluding and releasing hydrogen.

15. A module battery according to claim 9, wherein the electrode group is bound with a band.

16. A module battery according to claim 9, wherein a working pressure of the safety vent is 0.2–0.5 MPa.

17. A module battery according to claim 9, wherein spaces are provided between adjacent ones of the cells to permit a cooling medium to pass through the spaces.

18. A module battery according to claim 9, wherein the cells are connected in series.

19. A module battery according to claim 9, wherein the cells are connected in parallel.

20. A module battery according to claim 9, wherein a number of the cells is between 2 and 40 inclusive.

21. A module battery according to claim 9, wherein the holder means comprises:

a pair of holders disposed so that the cells lie between the pair of holders in the cell connecting direction; and a plurality of connecting bands connecting the pair of holders.

22. A module battery according to claim 21, wherein each of the pair of holders comprises a plate.

23. A module battery according to claim 22, wherein:

the plate of said each of the pair of holders is an aluminum plate; and the plurality of connecting bands are iron.

24. A rectangular sealed alkaline storage battery according to claim 1, wherein an amount of the alkali electrolyte in the container is 1.5–2.0 $cm^3$ per Ah of battery capacity.

25. A module battery according to claim 9, wherein an amount of the alkali electrolyte in the container is 1.5–2.0 $cm^3$ per Ah of battery capacity.

* * * * *